(12) United States Patent
Danilov et al.

(10) Patent No.: US 10,944,826 B2
(45) Date of Patent: Mar. 9, 2021

(54) SELECTIVE INSTANTIATION OF A STORAGE SERVICE FOR A MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/374,726

(22) Filed: Apr. 3, 2019

(65) Prior Publication Data

US 2020/0322431 A1    Oct. 8, 2020

(51) Int. Cl.
*H04L 29/08* (2006.01)
*G06F 3/06* (2006.01)

(52) U.S. Cl.
CPC ........ *H04L 67/1097* (2013.01); *G06F 3/0604* (2013.01); *G06F 3/067* (2013.01); *G06F 3/0634* (2013.01)

(58) Field of Classification Search
CPC ..... H04L 67/1097; G06F 3/0604; G06F 3/067
USPC ........................................................ 709/202
See application file for complete search history.

(56) References Cited

U.S. PATENT DOCUMENTS

| 5,675,802 A | 10/1997 | Allen et al. |
| 5,805,788 A | 9/1998 | Johnson |
| 5,950,225 A | 9/1999 | Kleiman |
| 6,502,243 B1 | 12/2002 | Thomas |
| 7,389,393 B1 | 6/2008 | Karr et al. |
| 7,577,091 B2 | 8/2009 | Antal et al. |
| 7,631,051 B1 * | 12/2009 | Fein ........................ H04L 45/00 709/212 |
| 7,664,839 B1 * | 2/2010 | Karr ...................... G06F 3/0604 709/223 |
| 7,680,875 B1 | 3/2010 | Shopiro et al. |

(Continued)

OTHER PUBLICATIONS

Natarajan, Raid 0, Raid 1, Raid 5, Raid 10 Explained with Diagrams, Aug. 10, 2010, thegeekstuff.com (18 pages).*

(Continued)

*Primary Examiner* — Wing F Chan
*Assistant Examiner* — Leon Y Tseng
(74) *Attorney, Agent, or Firm* — Amin, Turocy & Watson, LLP

(57) ABSTRACT

Selective instantiation of a mapped cluster storage service (MCSS) is disclosed. An MCSS instance can be run on computing resources of a real node of a real cluster, wherein the real node comprises real storage device, and wherein a portion of the real storage devices map to a mapped node of a mapped cluster built on the real cluster. The instance of the MCSS can be run near to the real disks of a mapped node to reduce computing resource consumption that can be associated with running the MCSS farther from the corresponding real disks. Moreover, whereas a mapped node can comprise real disks from different real nodes, a real node can be selected based on how many real disks are contributed to a single mapped node, which can result in executing the MCSS instance nearer to a greater proportion of real disks contributing to a single mapped node.

20 Claims, 10 Drawing Sheets

(56) References Cited

U.S. PATENT DOCUMENTS

| | | |
|---|---|---|
| 7,721,044 B1 | 5/2010 | Chatterjee et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,751,599 B2 * | 6/2014 | Tran .............. H04L 67/2842 709/216 |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,972,478 B1 | 3/2015 | Storer et al. |
| 9,003,086 B1 | 4/2015 | Schuller et al. |
| 9,052,942 B1 * | 6/2015 | Barber .............. G06F 3/0604 |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 * | 12/2015 | Miller .............. G06F 3/0644 |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 * | 6/2018 | Chatterjee ............. G06F 3/0689 |
| 10,055,145 B1 | 8/2018 | Danilov et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Saifare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 * | 9/2016 | Bannister .............. G06F 3/0605 |
| 2016/0292429 A1 | 9/2016 | Bannister et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |

(56) References Cited

U.S. PATENT DOCUMENTS

| | | |
|---|---|---|
| 2017/0262187 A1 | 9/2017 | Manzanares et al. |
| 2017/0268900 A1 | 9/2017 | Nicolaas et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1* | 12/2018 | Chirammal ......... H04L 67/1097 |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1* | 2/2019 | Shah ........................ G06F 3/065 |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1* | 11/2019 | Yanovsky ........... G06F 12/0848 |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Wang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6", Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.

(56) References Cited

OTHER PUBLICATIONS

Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Notice of Allowance received for U.S. Appl. No. 16/374,726 dated Jan. 6, 2021, 56 pages.
Non-Final Office Action received for U.S. Appl. No. 16/399,895 dated Jan. 4, 2021, 64 pages.
Final Office Action received for U.S. Appl. No. 16/511,161 dated Dec. 30, 2020, 61 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.

* cited by examiner

↙ 213

|  | 240, mn1 | 240, mn2 | 240, mn3 | 240, mn4 | 242, mn1 | 242, mn2 | 242, mn3 | 242, mn4 |
|---|---|---|---|---|---|---|---|---|
| node 1 | 1.2, 1.4 |  |  |  |  |  | 1.1, 1.3 |  |
| node2 |  | 2.1 |  |  |  | 2.2 to 2.4 |  |  |
| node3 |  |  |  |  | 3.1 to 3.4 |  |  |  |
| node4 |  |  | 4.3 |  |  |  |  | 4.1, 4.2, 4.4 |
| node5 |  | 5.2 to 5.4 |  |  |  | 5.1 |  |  |
| node6 | 6.1, 6.4 |  |  |  |  |  | 6.2, 6.3 |  |
| node7 |  |  |  | 7.1 to 7.4 |  |  |  |  |
| node8 |  |  | 8.1, 8.3, 8.4 |  |  |  |  | 8.2 |

↙ 330

|  | 240, mn1 | 240, mn2 | 240, mn3 | 240, mn4 | 242, mn1 | 242, mn2 | 242, mn3 | 242, mn4 |
|---|---|---|---|---|---|---|---|---|
| node 1 | two |  |  |  |  |  | two |  |
| node2 |  | one |  |  |  | three |  |  |
| node3 |  |  |  |  | four |  |  |  |
| node4 |  |  | one |  |  |  |  | three |
| node5 |  | three |  |  |  | one |  |  |
| node6 | two |  |  |  |  |  | two |  |
| node7 |  |  |  | four |  |  |  |  |
| node8 |  |  | three |  |  |  |  | one |

MC STORAGE SERVICE (MCSS) COMPONENT 312

MCSS DATA 314

↗ 350

| Iter. # | Group(s) | Action(s) |
|---|---|---|
| 1 | 3.1 to 3.4 | Assign MCSS for 242, mn1 to real node 3 |
| 2 | 7.1 to 7.4 | Assign MCSS for 240, mn4 to real node 7 |
| 3 | 2.2 to 2.4 | Assign MCSS for 242, mn2 to real node 2 |
| 4 | 4.1, 4.2, 4.4 | Assign MCSS for 242, mn4 to real node 4 |
| 5 | 5.2 to 5.4 | Assign MCSS for 240, mn2 to real node 5 |
| 6 | 8.1, 8.3, 8.4 | Assign MCSS for 240, mn3 to real node 8 |
| 7 | 1.2, 1.4 | Assign MCSS for 240, mn1 to real node 1 |
| 8 | 1.1, 1.3 | Skip, real node 1 has existing MCSS iteration |
| 9 | 6.1, 6.4 | Next (MCSS for 240, mn1 already assigned) |
| 10 | 6.2, 6.3 | Assign MCSS for 242, mn3 to real node 6 |
| 11 | 1.1, 1.3 | Nest (MCSS for 242, mn3 already assigned) |
| 12 | 2.1 | Next (MCSS for 240, mn2 already assigned) |
| 13 | 4.3 | Next (MCSS for 240, mn3 already assigned) |
| 14 | 5.1 | Next (MCSS for 242, mn2 already assigned) |
| 15 | 8.2 | Nest (MCSS for 242, mn4 already assigned) |
| 16 | Finish | All mapped node MCSSs assigned |

FIG. 3

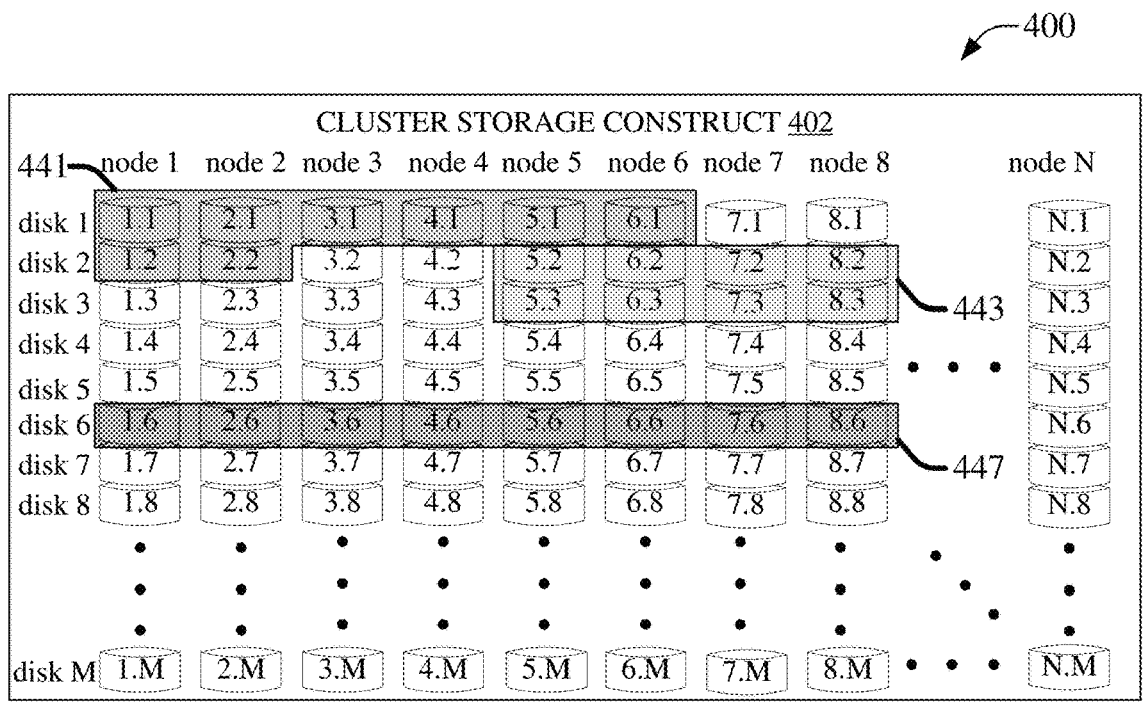
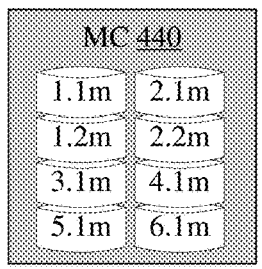 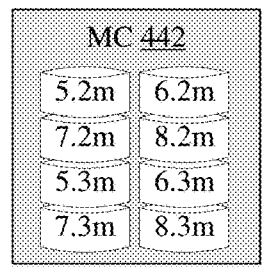 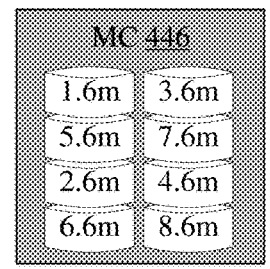
|       | 440, mn1 | 440, mn2 | 442, mn1 | 442, mn2 | 446, mn1 | 446, mn2 |
|-------|----------|----------|----------|----------|----------|----------|
| node 1| 1.1, 1.2 |          |          |          | 1.6      |          |
| node2 |          | 2.1, 2.2 |          |          | 2.6      |          |
| node3 | 3.1      |          |          |          |          | 3.6      |
| node4 |          | 4.1      |          |          |          | 4.6      |
| node5 | 5.1      |          | 5.2, 5.3 |          | 5.6      |          |
| node6 |          | 6.1      |          | 6.2, 6.3 | 6.6      |          |
| node7 |          |          | 7.2, 7.3 |          |          | 7.6      |
| node8 |          |          |          | 8.2, 8.3 |          | 8.6      |
413
|       | 440, mn1 | 440, mn2 | 442, mn1 | 442, mn2 | 446, mn1 | 446, mn2 |
|-------|----------|----------|----------|----------|----------|----------|
| node 1| two      |          |          |          | one      |          |
| node2 |          | two      |          |          | one      |          |
| node3 | one      |          |          |          |          | one      |
| node4 |          | one      |          |          |          | one      |
| node5 | one      |          | two      |          | one      |          |
| node6 |          | one      |          | two      | one      |          |
| node7 |          |          | two      |          |          | one      |
| node8 |          |          |          | two      |          | one      |
430
FIG. 4

|        | 440, mn1 | 440, mn2 | 442, mn1 | 442, mn2 | 446, mn1 | 446, mn2 |
|--------|----------|----------|----------|----------|----------|----------|
| node 1 | 1.1, 1.2 |          |          |          | 1.6      |          |
| node2  |          | 2.1, 2.2 |          |          | 2.6      |          |
| node3  | 3.1      |          |          |          |          | 3.6      |
| node4  |          | 4.1      |          |          |          | 4.6      |
| node5  | 5.1      |          | 5.2, 5.3 |          | 5.6      |          |
| node6  |          | 6.1      |          | 6.2, 6.3 | 6.6      |          |
| node7  |          |          | 7.2, 7.3 |          |          | 7.6      |
| node8  |          |          |          | 8.2, 8.3 |          | 8.6      |

|        | 440, mn1 | 440, mn2 | 442, mn1 | 442, mn2 | 446, mn1 | 446, mn2 |
|--------|----------|----------|----------|----------|----------|----------|
| node 1 | two      |          |          |          | one      |          |
| node2  |          | two      |          |          | one      |          |
| node3  | one      |          |          |          |          | one      |
| node4  |          | one      |          |          |          | one      |
| node5  | one      |          | two      |          | one      |          |
| node6  |          | one      |          | two      | one      |          |
| node7  |          |          | two      |          |          | one      |
| node8  |          |          |          | two      |          | one      |

| Iter. # | Group(s) | Action(s) |
|---------|----------|-----------|
| 1  | 1.1, 1.2 | Assign MCSS for 440, mn1 to real node 1 |
| 2  | 2.1, 2.2 | Assign MCSS for 440 mn2 to real node 2 |
| 3  | 5.2, 5.3 | Assign MCSS for 442, mn1 to real node 5 |
| 4  | 6.2, 6.3 | Assign MCSS for 442, mn2 to real node 6 |
| 5  | 7.2, 7.3 | Next (MCSS for 442 mn1 already assigned) |
| 6  | 8.2, 8.3 | Next (MCSS for 442 mn2 already assigned) |
| 7  | 1.6      | Skip, real node 1 has existing MCSS iteration |
| 8  | 2.6      | Skip, real node 2 has existing MCSS iteration |
| 9  | 3.1      | Next (MCSS for 240, mn1 already assigned) |
| 10 | 3.6      | Assign MCSS for 446 mn2 to real node 3 |
| 11 | 4.1      | Next (MCSS for 440 mn2 already assigned) |
| 12 | 4.6      | Next (MCSS for 446 mn2 already assigned) |
| 13 | 5.1      | Next (MCSS for 440, mn1 already assigned) |
| 14 | 5.6      | Skip, real node 5 has existing MCSS iteration |
| 15 | 6.1      | Next (MCSS for 440, mn2 already assigned) |
| 16 | 6.6      | Skip, real node 6 has existing MCSS iteration |
| 17 | 7.6      | Next (MCSS for 446 mn2 already assigned) |
| 18 | 8.6      | Next (MCSS for 446 mn2 already assigned) |
| 19 | 1.6      | Special Action for MCSS for 446 mn1 |
| 20 | 2.6      | Next (MCSS for 446 mn2 already assigned) |
| 21 | 5.6      | Next (MCSS for 446 mn1 already assigned) |
| 22 | 6.6      | Next (MCSS for 446 mn1 already assigned) |
| 23 | Finish   | All mapped node MCSSs assigned |

|        | MCSS instance(s) |
|--------|------------------|
| node 1 | 440 mn1 and 446 mn1 |
| node2  | 440 mn2 |
| node3  | 446 mn2 |
| node4  |         |
| node5  | 442 mn1 |
| node6  | 442 mn2 |
| node7  |         |
| node8  |         |

FIG. 5

SELECTIVE INSTANTIATION OF A STORAGE SERVICE FOR A MAPPED REDUNDANT ARRAY OF INDEPENDENT NODES

TECHNICAL FIELD

The disclosed subject matter relates to data storage, more particularly, to instantiating, on computing resource of a real storage device node, a storage service supporting a mapped storage device to a corresponding real storage device, wherein the instantiation is based on a mapping of mapped storage devices to real storage devices.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

BRIEF DESCRIPTION OF DRAWINGS

FIG. 3 is an illustration of an example system that can enable selective instantiation of a mapped node storage service at a real node ordered by a count of real disks supporting a mapped node, in accordance with aspects of the subject disclosure.

FIG. 4 is an illustration of an example system that can facilitate selective instantiation of a mapped node storage service at a real node based on a mapping of mapped disks to real disks, wherein a real node can support multiple instantiations of a mapped node storage service, in accordance with aspects of the subject disclosure.

FIG. 5 is an illustration of an example system that can facilitate selective instantiation of a mapped node storage service at a real node ordered by a count of real disks supporting a mapped node, wherein a real node can support multiple instantiations of a mapped node storage service, in accordance with aspects of the subject disclosure.

DETAILED DESCRIPTION

Figure 1:
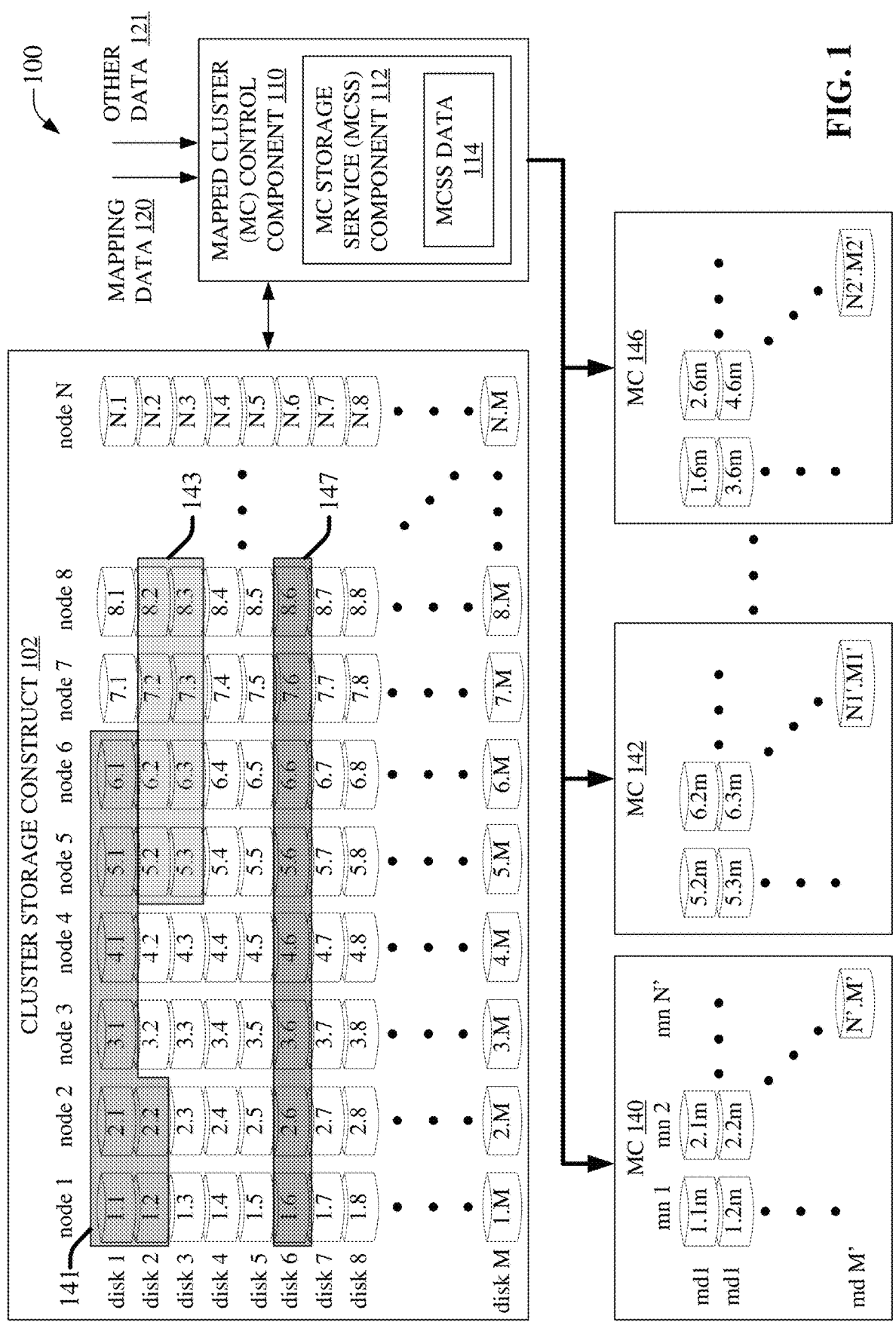
FIG. 1 is an illustration of an example system that can facilitate selective instantiation of a mapped node storage service at a real node, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices, hereinafter a cluster, real cluster, cluster storage construct, etc. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

Figure 10:
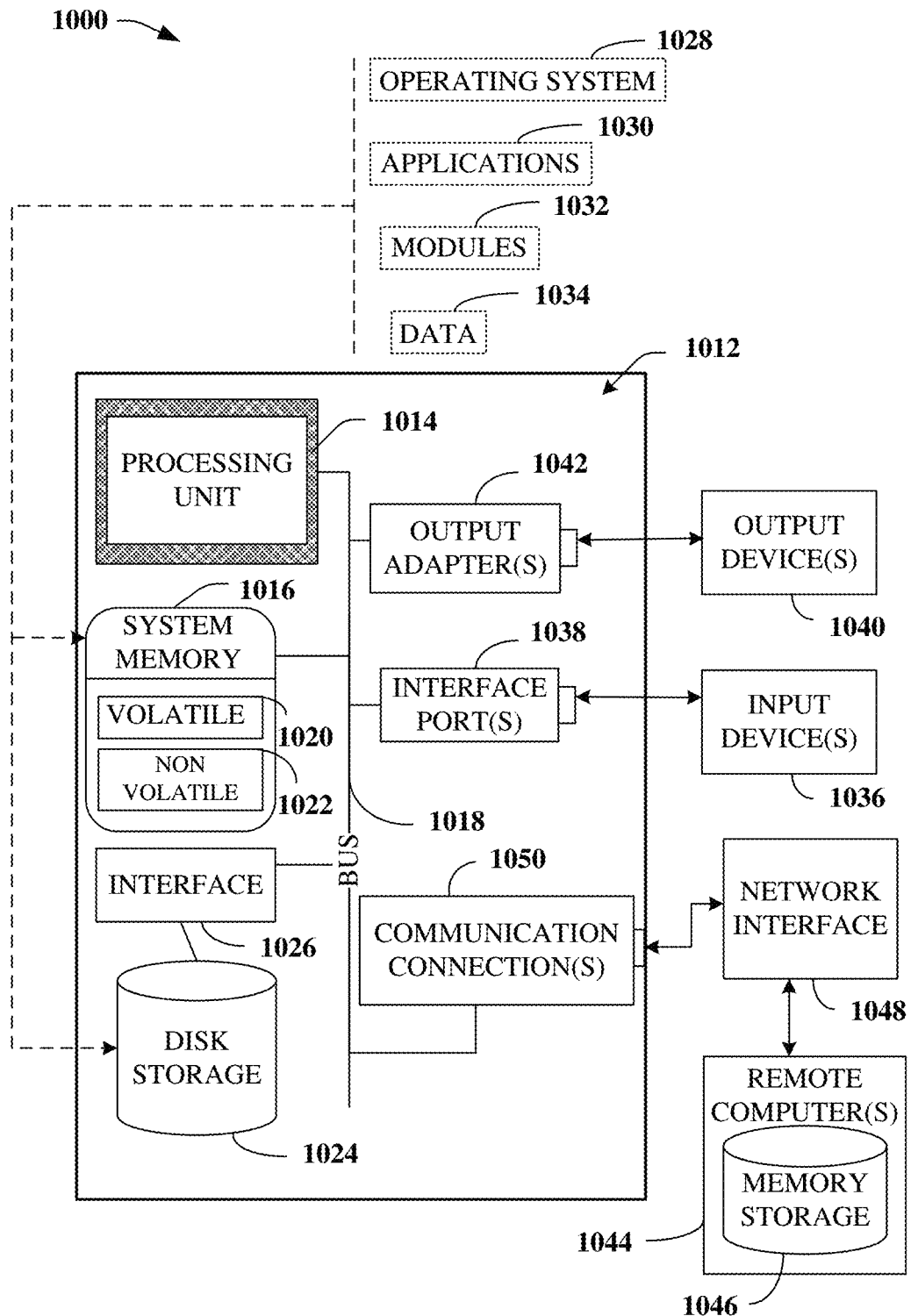
FIG. 10 illustrates an example block diagram of a computing system operable to execute the disclosed systems and methods in accordance with an embodiment.

Whereas a real cluster(s) can comprise real nodes, and the real nodes can comprise real data storage devices, e.g., real disks, real nodes can comprise computing resources, e.g., a processor(s), memory(ies), network interface(s), user interface(s), etc., such as is illustrated at FIG. 10, etc. The real node can be a discrete hardware node that comprises real storage devices, for example a real node can be a rack mounted controller interacting with M hard disks, for example in a rack that can be separate from another real node that can comprise a second rank mounted controller and other real storage devices. In an embodiment, a real node can execute operations related to control of the real node, for example, managing data storage space provided by the example M hard disks, etc. Further, a real node can execute an instance of a mapped cluster storage service that can enable the virtualization of real storage space into mapped clusters that can span real nodes of a real cluster(s), e.g., interaction between MCSS instances executing on different real node computing resources can enable data interaction via a mapped cluster comprising mapped nodes comprising mapped disks.

In an embodiment of the presently disclosed subject matter, a mapped redundant array of independent nodes, hereinafter a mapped RAIN, can comprise a mapped cluster, wherein the mapped cluster comprises a logical arrangement of storage locations of real storage devices. A real cluster(s), e.g., a group of real storage devices comprised in one or more hardware nodes that can be comprised in one or more clusters, can be allocated so as to allow more granular use of the real cluster in contrast to conventional storage techniques, e.g., mapped clusters can be built above a real cluster to allows the real cluster to be used with more granularity. As an example, in conventional techniques, an multiple real nodes of a real cluster can be dedicated for use by a customer, while in contrast, multiple mapped nodes can be dedicated for use by the customer where each mapped node can map to a portion of a real node, thereby enabling the customer to use only a portion of the corresponding multiple real nodes, e.g., which is a more granular use of the real node storage space. In an aspect, a mapped cluster can comprise mapped nodes that can provide data redundancy that, in an aspect, can allow for failure of a portion of one or more mapped nodes of the mapped cluster without loss of access to stored data, can allow for removal/addition of one or more nodes from/to the mapped cluster without loss of access to stored data, etc. As an example, a mapped cluster can comprise mapped nodes having a data redundancy scheme analogous to a redundant array of independent disks (RAID) type-6, e.g., RAID6, also known as double-parity RAID, etc., wherein employing a mapped node topology and two parity stripes on each mapped node can allow for two mapped node failures before any data of the mapped cluster may become inaccessible, etc. In other example embodiments, a mapped cluster can employ other mapped node topologies and parity techniques to provide data redundancy, e.g., analogous to RAID0, RAID1, RAID2, RAID3, RAID4, RAID5, RAID6, RAID0+1, RAID1+0, etc., wherein a mapped node of a mapped cluster can comprise one or more mapped disks, and the mapped node can be loosely similar to a disk in a RAID system. Unlike RAID technology, an example mapped RAIN system can provide access to more granular storage in, for example, very large data storage systems that can often on the order of terabytes, petabytes, exabytes, zettabytes, or even larger, because each mapped node can generally comprise a plurality of mapped disks, unlike RAID technologies.

In an embodiment, software, firmware, etc., can hide the abstraction of mapping nodes in a mapped RAIN system, e.g., the group of mapped nodes can appear to be a contiguous block of data storage even where, for example, it can be spread across multiple portions of one or more real disks, multiple real groups of hardware nodes, multiple real clusters of hardware nodes, multiple geographic locations, etc. For a given real cluster, e.g., real RAIN, that is N real disks wide and M real disks deep, a mapped cluster, e.g., a mapped RAIN, can consist of up to N' mapped nodes that each manage up to M' mapped disks, e.g., portions of real disks of the corresponding real nodes. Accordingly, in an embodiment, one mapped node can be readily manage mapped disks corresponding to different real disks of real nodes of one or more real clusters. Similarly, in an embodiment, portions of real disks of one real node can be readily be managed by mapped nodes of one or more mapped clusters. In some embodiments, for example, according to a data loss protection rule, etc., a mapped cluster can be prohibited from using two real disks of one real node, which prohibition can harden the mapped RAIN cluster against a failure of the one real node because, otherwise, loss of the one real node can compromise the two or more supported mapped disks in two different mapped nodes and lead to a data loss event where the redundancy of the mapped cluster is not designed to protect against the loss of more than one mapped node of the mapped cluster. In other embodiments, a data loss protection rule can correspond to other mapped cluster schema that can protect against the loss of more or less mapped nodes, e.g., in some embodiments where the mapped cluster redundancy is designed to withstand a loss of two mapped nodes, the related data loss protection rule can allow for one real node to support mapped disks from two mapped nodes of the same mapped cluster. It is noted that all such data loss protection rules are considered within the scope of the present disclosure even where not explicitly recited for the sake of clarity and brevity. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey that the mapped node is an abstraction of real storage space that is distinct from a real node and the corresponding real physical hardware component(s) and/or computing resource(s) of the real node, e.g., while data is actually stored on a real cluster/node/disk, the data storage can abstracted to appear as being stored in a mapped cluster/node/disk such that one or more mapped cluster/node/disk can be 'built on top' of a real cluster/node/disk. As an example, a data storage customer can use a mapped cluster for data storage whereby the storage data is actually stored in various real data storage locations of a real data storage system, e.g., a real cluster, etc., according to a logical mapping between the real cluster and the mapped cluster. This example can enable the mapped cluster to have more granular data storage than in conventional allocation of storage space from real clusters.

In an embodiment, a mapped cluster can be comprised in a real cluster, e.g., the mapped cluster can be N' mapped nodes by M' mapped disks in size and the real cluster can be N real nodes by M real disks in size, where N'=N and where M'=M. In other embodiments, N' can be less than, or equal to, N, and M' can be less than, or equal to, M. While it is also possible that N' can be less than N, this is generally disfavored due to potential data loss events, as is discussed in more detail below. It will be noted that in some embodiments, M' can be larger than M, e.g., where the mapping of a M real disks into M' mapped disks portions comprises use of a part of one of the M disks, for example, 10 real disks (M=10) can be mapped to 17 mapped disk portions (M'=17), can be mapped to 11 mapped disk portions (M'=11), can be mapped to 119 mapped disk portions (M'=119), etc. In some embodiments, the mapped cluster can be smaller than the real cluster. Moreover, where the mapped cluster is sufficiently small in comparison to the real cluster, the real cluster can accommodate one or more additional mapped clusters. In an aspect, where mapped clusters are smaller than a real cluster, the mapped cluster can provide finer granularity of the data storage system. As an example, where the real cluster is 8×8, e.g., 8 real nodes by 8 real disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

In an aspect an instance of a storage service can enable interaction with data stored via a mapped disk of a mapped node, e.g., writing, reading, modifying, moving, copying, duplicating, deleting, freeing, etc., of data in a mapped cluster abstraction can be performed on data of a real disk of a real node of a real cluster via an instance of a storage service. In an embodiment, an instance of a storage service, herein after simply 'storage service' for clarity and brevity, can execute on a component of a real cluster storage system. In some embodiments, the storage service can execute in a dedicated component, for example a mapped cluster control component, e.g., 110, etc., that can be local to, or located remotely from, a real disk of a real cluster. In some embodiments, the storage service can execute on a component of a real node, e.g., on a computing resource of a hardware node, etc., comprised in the real cluster. As an example, an example real cluster can be comprised of eight real nodes in a data center, wherein each real node comprises M real disks, wherein each real node comprises computing resources, and wherein the computing resources can support execution of one or more instances of storage services to enable building a mapped cluster on top of the real cluster. It can be appreciated that executing a storage service on the 8th real node of the cluster to support a mapped node of the mapped cluster storing data via real disks of the 1st real node, e.g., the mapped node maps to the 1st real node, can entail interaction between the computing resources of the 1st and 8th real node. This interaction can be an extraneous burden on computing resources in comparison to performing the storage service on the 1st real node where the storage service can more directly support the data stored on the 1st real node without the extra communications to the 8th real node noted earlier. Accordingly, it can be desirable to instantiate storage service instances based on a mapping of mapped clusters to real clusters.

In some embodiments, a performance of computing resources can act as a further metric to the selective instantiation of a storage service. Returning to the previous example, where the 1st real node computing resources are, for example, determined to be inappropriate for executing the instance of the storage service, it can be desirable to then instantiate the storage service on another real node, for example the 8th real node. The analysis of computing resources of a real node can indicate a level performance that can be employed in determining if that real node is appropriate to execute a storage service. In an iteration of the previous example, the 1st real node can comprise fewer and older processors than the 8th real node, which can be used to determine that executing the storage service on the 1st real node can have lower performance than execution on the 8th real node even where there is additional computing resource overhead in signaling between the 1st and 8th real nodes. In another iteration of the previous example, the 1st real node can already be executing other instances of storage services, e.g., for other mapped nodes, etc., and it can be determined that executing a further storage service would degrade performance sufficiently that it then becomes preferable to execute the further storage service on the 8th real node even where there is additional computing resource overhead in signaling between the 1st and 8th real nodes. In a yet further iteration of the previous example, the 1st real node can be scheduled to be repaired and storage services, etc., can be in the process of being moved to other real nodes, which can cause the further instance of the storage service to be performed on another real node computing resource, e.g., it can be likely that the data of the mapped node and the instance of the corresponding storage service can be moved to the same real node, e.g., the 8th real node in this example. Numerous other computing resource performance metrics can be determined and employed in the selective instantiation of a storage service and are to be considered within the scope of the instant subject matter even where not explicitly recited for the sake of clarity and brevity. Examples of other metrics can include, processor factors such as count, speed, etc., memory factors such as an amount of memory, speed, throughput, etc., network factors such as bandwidth, cost, latency, reliability, etc., location, reliability, monetary cost, geopolitical factors, etc. Moreover, in some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a still further example, a mapped cluster can comprise storage space from a first cluster having hardware nodes in a first data center in Seattle, Wash., and a second data center having hardware nodes in Tacoma, Wash. As yet another example, a mapped cluster can comprise storage space from a first cluster having hardware nodes in a first data center in Houston, Tex., and a second cluster having hardware nods in a data center in Mosco, Russia. Accordingly, in regards to selective instantiation of storage services can comprise determining computer resource metrics that reflect the topology of one or more real clusters/nodes/disks/etc., and their supporting computing resource(s). As an example, a real cluster can comprise data storage in a first data center located in Seattle, which can be subject to earthquakes, frequent violent political events, etc., and in a second data center located in Spokane, which can be less prone to earthquakes and political events, whereby it can have a higher computing resource cost to execute a storage service in Seattle to support data physically stored in Spokane. However, where the cost of storing data in Spokane nodes can be far less costly (e.g., lower monetary cost, lower risk of loss in a political riot/earthquake, etc.), and where there can be more up-to-date computing resources in Seattle nodes, there can be situations where it can be desirable to execute a storage service instance in Seattle for data physically storage in Spokane.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate selective instantiation of a mapped node storage service at a real node, in accordance with aspects of the subject disclosure. System 100 can comprise mapped cluster control component 110. Mapped cluster control component 110 can receive mapping data 120 and can facilitate mapped clusters, e.g., MC 140-146, etc., based on mapping data 120. Mapped cluster control component 110 can also receive other data 121 that can also facilitate mapping mapped clusters, for example, a mapping rule(s), a mapping scheme, a real disk/real node/real cluster selection criterion, etc. In an aspect, mapped cluster component 110 can generate, maintain, adapt, delete, release, etc., mapped clusters based on mapping data 120, other data 121, etc. Moreover, a mapped cluster, e.g., MC 120-146, etc., can be a logical storage cluster built on top of a real cluster(s), e.g., cluster storage construct 102. As an example, MC 140 can be a 4×2 mapped cluster, e.g., four mapped nodes of two mapped disks on each mapped node for a total of 8 mapped disks, etc., that can be mapped to storage of data on 8 real disks of a real cluster, for example, real cluster portion 141, e.g., two real nodes of two real disks each and four real nodes of one disk each, of cluster storage construct 102, etc. As another example, MC 142 can be a 4×2 mapped cluster that can be mapped to storage of data on 8 real disks of a real cluster, for example, real cluster portion 143, e.g., four real nodes of two real disks each, of cluster storage construct 102, etc. As a third example, MC 146 can be a 4×2 mapped cluster that can be mapped to storage of data on 8 real disks of a real cluster, for example, real cluster portion 147, e.g., eight real nodes of one real disks each, of cluster storage construct 102, etc.

Mapped cluster control component 110 can comprise MC storage service (MCSS) component 112. MCSS component 112 can facilitate instantiation of a storage service instance. A storage service instance can enable interaction with data stored via a mapped disk of a mapped node. As an example, data stored via the mapped disks of MC 140 can be stored in portion 141 of cluster storage construct 102 and can be interacted with via a corresponding instance of a storage service. In this example, the storage service, in an embodiment, can be executed by MC control component 110. In another embodiment of this example, the storage service instance can execute on computer resources of any of real nodes 1 to 6, for example, on computer resources of real node 1. In a further embodiment of this example, the storage service instance can execute on computer resources of any of real nodes 1 to N, for example, on computer resources of real node 7. In an example storage service executing on the computing resources of real node 1, the storage service instance can enable writing, reading, modifying, moving, copying, duplicating, deleting, freeing, etc., data stored on one or more of the disks of portion 141 corresponding to data events via MC 140 and associated mapped disks of the constituent mapped nodes.

In some embodiments, for example where MC 140 comprises four mapped nodes, e.g., a 4×2 mapped cluster, there can be four instances of storage services that can run on any four real nodes of cluster storage construct 102, for example, real nodes 1, 2, 5, and 6, etc. In this example, a first instance of the storage services on real node 1 can correlate to data events of mapped node 1 of MC 140, a second instance of the storage services on real node 2 can correlate to data events of mapped node 2 of MC 140, a third instance of the storage services on real node 5 can correlate to data events of mapped node 3 of MC 140, e.g., corresponding to real disks 3.1 and 4.1, etc., a fourth instance of the storage services on real node 6 can correlate to data events of mapped node 4 of MC 140, e.g., corresponding to real disks 5.1 and 6.1, etc. Numerous other examples of executing a storage service instance to control data interactions via mapped nodes for data stored on real disks will be readily appreciated and are within the scope of the instant disclosure even where not explicitly recited for the sake of clarity and brevity, for example, as an alternate form of the preceding example, the first instance of the storage services on real node 1 can correlate to data events of mapped node 1 of MC 140, the second instance of the storage services on real node 2 can correlate to data events of mapped node 2 of MC 140, the third instance of the storage services on real node 5 can correlate to data events of mapped node 4 of MC 140, e.g., corresponding to real disks 3.1 and 6.1, etc., the fourth instance of the storage services on real node 6 can correlate to data events of mapped node 3 of MC 140, e.g., corresponding to real disks 5.1 and 4.1, etc.

MCSS comp 112 can generate MCSS data 114, which can indicate and enable an instantiation scheme(s) facilitating interaction with data stored via a mapped cluster on a real cluster, for example, MCSS data 114 can indicate that a first instance of the storage services will execute on real node 1 and will correlate to controlling data events for mapped node 1 of MC 140, a second instance of the storage services will execute on real node 2 corresponding to data events of mapped node 2 of MC 140, etc.

In an aspect, mapped disks and mapped nodes of a mapped cluster can map to nearly any constellation of real storage locations, e.g., real disks, real nodes, real clusters, or portions thereof, etc. In an aspect, a 4×2 mapped cluster could similarly be mapped to data storage in a 4×2 portion of a real cluster, an 8×1 portion of a real cluster, a 2×2 and a 4×1 portion of a real cluster, etc. Generally, according to a typical data loss prevention rule, mapped clusters can comprise nearly any configuration of real storage areas, except two real disks of one real node should not be mapped with two different mapped nodes of one mapped cluster. This can reduce potential data loss events where a single mapped cluster that comprises two mapped nodes that each use real disks of the same real node, such that a data loss event could occur if the real node becomes less accessible, e.g., if the real node fails, slows, crashes, reboots, is damaged, etc. As an example, if the 4×2 example mapped cluster is mapped to data storage in a 2×4 portion of the real cluster, rather than for example into an 4×2 portion of the real cluster, then failure of one of the two real nodes of the real cluster may compromise data stored in two of the four mapped nodes of the mapped cluster. If the example mapped cluster employs data redundancy allowing the loss of only one mapped node, then the loss of two mapped nodes can result in a data loss event. As such, it can generally be prescribed that the example 4×2 mapped cluster be mapped into at least four real nodes of a real cluster, although it can certainly be mapped to nearly any disk of the four real nodes, and similarly, can be mapped to more than four real nodes, etc., wherein the mapping does not result in data stored according to the mapped cluster causing data in two mapped nodes to be stored in one real node. In some embodiments, a mapped cluster(s) can be hardened to withstand the loss of more than one mapped node and the data loss prevention rule can correspondingly be in accord with this more rugged mapped cluster implementation. These other data loss prevention rules are not further discussed simply for clarity and brevity, although all such other data loss prevention rules are within the scope of the instant disclosure.

In an aspect, where an instance of a storage service executes on computer resources of a real node, it can be desirable to have it execute on a real node that comprises real disks storing data corresponding to the mapped cluster associated with the instance of the storage service. As an example, executing an instance of a storage service for MC 140 on computing resources of real node 7 of cluster storage construct 102 can result in loading computing resources to communicate between real nodes 1-6 (of portion 141 corresponding to MC 140) and real node 7, which can be different than if the instance of the storage service were executing on any of real nodes 1-6. As an example, a data interaction with data of mapped disk 1.1m of MC 140 can result in interacting with data on real disk 1.1, and this interaction can be enabled by first communicating information from real node 1 to real node 7, where it can be processed by the instance of the storage service, then a result can be communicated back to real node 1 to facilitate the data interaction. In contrast, where the instance of the storage service is executing on real node 1, the data interaction can be processed by the storage service directly on real node 1. In an aspect, real node 2 can execute a second storage service instance for interactions with data stored in mapped node 2 of MC 140, etc.

Reducing loading on computing resources can be beneficial in a storage system and, accordingly, MCSS component 112 can determine where to instantiate instances of storage services according to one or more rules, resulting in MCSS data 114. In an embodiment, MC control component 110 can be comprised in cluster storage construct 102, e.g., as a separate component, executing on a computing resource of a real node, etc. In other embodiments, MC control component 110 can be a comprised apart from cluster storage construct 102, e.g., as a local or remotely located component that can communicate with cluster storage construct 102. In further embodiments, e.g., embodiments where cluster storage construct 102 spans discrete physical locations, for example data centers in different cities, countries, etc., MC control component 110 can be comprised in a portion of cluster storage constrict 102, as a separate local or remotely located component, etc.

Additionally, in an aspect, determining where to instantiate a storage service instance can be based on metric of computer resources of component(s) of cluster storage construct 102. As an example, where an instance of a storage service can execute on real node 4 or real node 5, the real node can be selected based on a determined effect on the computing resources of the candidate real nodes. In this example, let real node 4 computer resources be more limited than those of real node 5, such that real node 5 can be selected due to the instance of the storage services having less impact on the greater resources of real node 5 than would be experienced by running the instance on real node 4. In a variation of the preceding example, where real node 5 can already be running two instances of storage services, for example for real disk 5.1 of portion 141, corresponding to a mapped node of MC 140, and real disks 5.2 and 5.3 of portion 143, corresponding to a mapped node of MC 142, it can be determined that adding a third instance to real node 5 can be more burdensome on the computing resources of real node 5 than a comparable burden on the computing resources of real node 4 that may only be running, for example, one existing instance for real disk 4.1 of portion 141.

In an embodiment of the disclosed subject matter, MCSS data 114 can result in execution of instances of storage services on real nodes comprising greater numbers of real disks mapping to a mapped node of a mapped cluster. As an example, determining that an instance of a storage service one real node 1 can be related to either portion 141 or portion 147 of the real cluster, e.g., the storage service instance can support data interactions for either mapped node 1 of MC 140 (mapped disks 1.1m and 1.2m map to real disk 1.1. and 1.2 of real node 1), or mapped node 1 of MC 146 (mapped disk 1.6m maps to real disk 1.6 or real node 1). Where more real disks of real node 1 support MC 140, e.g., two real disks support MC 140 while only one real disk supports MC 146, the instance of the storage service for mapped node 1 of MC 140 can be instantiated on real node 1 and a second instance of a storage service for mapped node 1 of MC 146 can be instantiated on another real node, for example real node 3, etc., or in some embodiments, where there is sufficient computer resources at real node 1, the second instance can also be instantiated on real node 1. In an aspect, mapping of mapped nodes to real disks can enable an analysis of groups/counts of real disks corresponding to different mapped nodes to enable assigning, sorting, ranking, etc., instantiation of storage services to real nodes that comprise larger groups/counts. As an example, real node 1 can comprise a group of two in portion 141 (for MC 140) and a group of one in portion 147 (for MC 146), whereby the group of two can be ranked higher than the group of one, which can result in an instance of a storage service at real node 1 being related to mapped node 1 of MC 140 rather than to mapped node 1 of MC 146. As a second example, real node 5 can comprise a group of one in portion 141 (for MC 140), a group of two in portion 143 (for MC 142), and a group of one in portion 147 (for MC 146), whereby the group of two can be ranked higher than the groups of one, which can result in an instance of a storage service at real node 5 corresponding to interactions with data of mapped node 1 of MC 142 rather than to the mapped nodes of either MC 140 or MC 146.

Figure 2:
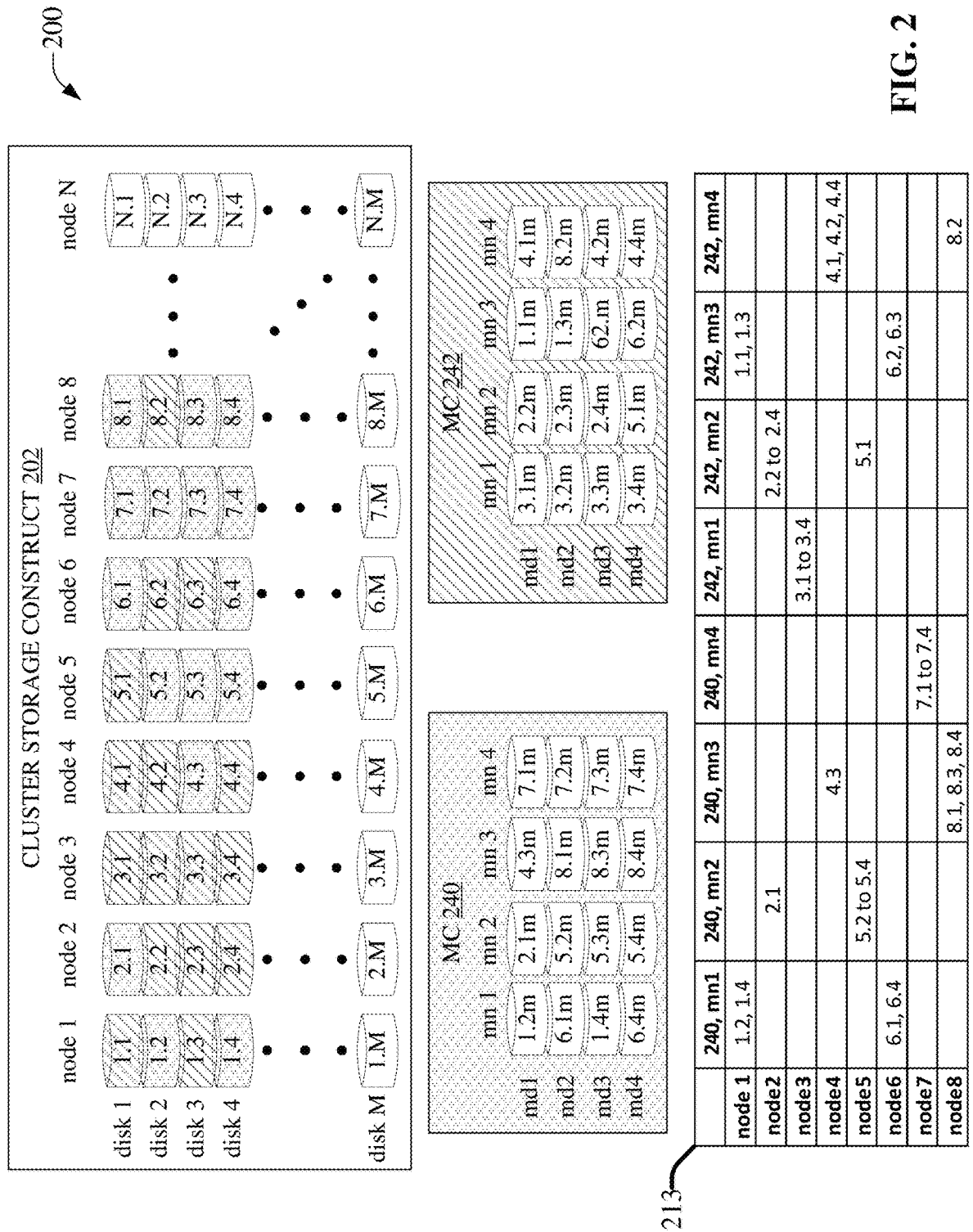
FIG. 2 is an illustration of an example system that can facilitate selective instantiation of a mapped node storage service at a real node based on a mapping of mapped disks to real disks, in accordance with aspects of the subject disclosure.

FIG. 2 is an illustration of a system 200, which can enable selective instantiation of a mapped node storage service at a real node based on a mapping of mapped disks to real disks, in accordance with aspects of the subject disclosure. System 200 can comprise cluster storage construct 202 that can comprise real disks arrayed in real nodes, e.g., N real nodes by M real disks. Cluster storage construct 202 can support mapped clusters, e.g., MC 240, 242, etc. MC 240 can be a 4×4 mapped cluster whose mapped disks, for example, correspond to the greyed disks of cluster storage construct 202, e.g., mapped disk 1.2m maps to real disk 1.2, etc. MC 242 can similarly be a 4×4 mapped cluster mapping to the stripped real disks of cluster storage construct 202, e.g., mapped disk 3.1m maps to real disk 3.1, etc. In an aspect, the white real disks of cluster storage construct 202 can support other mapped clusters or can be unused, available, etc.

Mapping table 213 can be determined for the mapping of MC 240 and MC 242 onto real disks of cluster storage construct 202. Mapping table 213 can, for example, indicate that real node 1 (read from the left hand column) contributes real disks 1.2 and 1.4 to mapped node 1 of MC 240 and real disks 1.1. and 1.3 to mapped node 3 of MC 242; that real node 2 contributes real disk 2.1 to mapped node 2 of MC 240 and real disks 2.2, 2.3, and 2.4 to mapped node 1 of MC 242; etc. Mapping table 213 can provide an understanding of groups/counts of real disks of a real node contributing to the support of mapped nodes of mapped clusters. Analysis of mapping table 213 can facilitate instantiation of storage services on real nodes based on what real disks participate in mapped nodes of mapped clusters.

A storage service instance can enable interaction with data stored via a mapped disk of a mapped node. As an example, data stored via the mapped disks of mapped node 1 of MC 140, e.g., mapped disks 1.2m, 6.1m, 1.4m, and 6.4m, can be stored in real disks of real nodes 1 and 6, e.g., real disk 1.2 of real node 1 can correspond to mapped disk 1.2m of mapped node 1, real disk 6.1 of real node 6 can correspond to mapped disk 6.1m of mapped node 1, real disk 1.4 of real node 1 can correspond to mapped disk 1.4m of mapped node 1, and real disk 6.4 of real node 6 can correspond to mapped disk 6.4m of mapped node 1. As a second example, data stored via real disks of real node 1, e.g., real disks 1.1 to 1.4, can support mapped disks of mapped nodes of mapped clusters, e.g., real disk 1.2 of real node 1 can correspond to mapped disk 1.2m of mapped node 1 of MC 240, real disk 1.4 of real node 1 can correspond to mapped disk 1.4m of mapped node 1 of MC 240, real disk 1.1 of real node 1 can correspond to mapped disk 1.1m of mapped node 3 of MC 242, and real disk 1.3 of real node 1 can correspond to mapped disk 1.3m of mapped node 3 of MC 242. Accordingly, real node 1 can be understood to support two groups of two real disks, e.g., two real disks (1.2 and 1.4) supporting mapped node 1 of MC 240 and two real disks (1.1 and 1.3) supporting mapped node 3 of MC 242.

In an embodiment, selection of an instantiation of a storage service can be based on a count of the real disks participating in support of a mapped node. Referring to illustrated example system 200, data stored via real disks of real node 2, e.g., real disks 2.1 to 2.4, can support mapped disks of mapped nodes of mapped clusters, e.g., real disk 2.1 of real node 2 can correspond to mapped disk 2.1m of mapped node 2 of MC 240, and real disks 2.2 to 2.4 of real node 2 can correspond to mapped disks 2.2m to 2.4m of mapped node 2 of MC 242. In this example, a group of one and a group of three real disks can be indicated, a group of one real disk (real disk 2.1) of real node 2 corresponds to mapped node 2 of MC 240 and a group of three real disks (real disks 2.2-2.4) of real node 2 correspond to mapped node 2 of MC 242. As such, node 2 can instantiate a storage service instance to support the larger group, e.g., the instantiated storage service can serve mapped disks 2.2m to 2.4m of mapped node 2 of MC 242. This can leave assignment of another instance of a storage service related to mapped node 2 of MC 240 for another real node, or in some embodiments, as a second instance of a storage service on real node 2.

FIG. 3 is an illustration of a system 300, which can facilitate selective instantiation of a mapped node storage service at a real node ordered by a count of real disks supporting a mapped node, in accordance with aspects of the subject disclosure. System 300 can comprise MCSS component 312 that can generate MCSS data 314. MCSS data 314, which can indicate an instantiation scheme(s) that can facilitate interaction with data stored via a mapped cluster built on top of a real cluster, for example, MCSS data 314 can indicate that a first instance of the storage services will execute on a first real node and will correlate to controlling data events for a first mapped node, that a second instance of the storage services will execute on a second real node corresponding to data events of a second mapped node, etc.

Mapping table 213 from FIG. 2 can be employed in determining count table 330. Mapping table 213 can indicate which real disks of real nodes are providing data storage corresponding to different mapped nodes of mapped clusters. Mapping table 213 can, for example, indicate that real node 1 (read from the left hand column) contributes real disks 1.2 and 1.4 to mapped node 1 of MC 240 and real disks 1.1. and 1.3 to mapped node 3 of MC 242; that real node 2 contributes real disk 2.1 to mapped node 2 of MC 240 and real disks 2.2, 2.3, and 2.4 to mapped node 1 of MC 242; etc. Mapping table 213 can provide an understanding of groups/counts of real disks of a real node contributing to the support of mapped nodes of mapped clusters. Analysis of mapping table 213 can facilitate instantiation of storage services on real nodes based on what real disks participate in mapped nodes of mapped clusters.

In an embodiment, count table 330 can be determined based on an analysis of mapping table 213. Count table 330 can indicate, for example, that real node 1 (again read from the left hand column) contributes two real disks to mapped node 1 of MC 240, e.g., corresponding to real disk 1.2 and 1.4, and two real disks to mapped node 3 of MC 242, e.g., corresponding to real disks 1.1 and 1.3; that real node 2 contributes one real disk to mapped node 2 of MC 240, e.g., corresponding to real disk 2.1, and three real disks to mapped node 1 of MC 242, e.g., corresponding to 2.2, 2.3, and 2.4; etc. The groups from count table 330, e.g., groups of one, two, three, four, etc., real disks, can be employed in directing where an instance of a storage service can execute. In an embodiment, storage services can be instantiated by simply rastering across mapping table 213 or count table 330. As an example, starting in the upper left corner of either mapping table 213 or count table 330, a first storage service for mapped node 1 of MC 240 can be provisioned on real node one, then a second storage service can be provisioned on real node 2 for mapped node 2 of MC 240 by skipping mapped node 3 of MC 242 because real node 1 already has one storage service, e.g., the first storage service, assigned, then a third storage service can be set at real node 3 for mapped node 1 of MC 242, etc. This embodiment, for example, can simply cause a storage service for the first mapped node being provided with real disks regardless of the count of real disks being provided. This can result in a storage service facilitating a larger group of real disks in the same mapped node but stored on another real node, e.g., the second storage service on real node 2 of the previous example also serves a group of three real disks on real node 5 because disks 5.2 to 5.4 are part of mapped node 2 of MC 240, etc.

In another embodiment, larger groups can be provisioned with an instance of a storage service before provisioning smaller groups. As an example, starting in the upper left corner of count table 330 and moving left to right then down, a first storage service can be set for the largest first largest group to be encountered, e.g., there are two groups of four real disks in count table 330, four real disks at mapped node 1 of MC 242 and four real disks at mapped node 4 of MC 240. As such, the first storage service can be instantiated on real node 3 for mapped node 1 of MC 242, then a second storage service can be provisioned on real node 7 for mapped node 4 of MC 240, then a third storage service can be set for the first group of three real disks, e.g., at real node 2 for mapped node 2 of MC 242, etc. This embodiment can cause a storage services to be instantiated by largest group first, which can place the storage service on a real node having the greatest number of real disks corresponding to a mapped node of a mapped cluster. This can reduce computing resource burdens by trying to keep the storage service instance closer to more of the real disks enabling a mapped node.

An example actions table 350 is illustrated for an embodiment of instantiating by group size from count table 330. At iteration number one, an MCSS can be assigned to real node 3 for mapped node 1 of MC 242, at iteration number two, an MCSS can be assigned to real node 7 for mapped node 4 of MC 240, at iteration number three, an MCSS can be assigned to real node 2 for mapped node 2 of MC 242, etc. At iteration number eight, it can be observed that a storage service has already been instantiated at real node 1, as can be observed at iteration number seven for mapped node 1 of MC 240. As such, causing a storage service instance for real disks 1.1 and 1.3 at real node 1 would represent a second instance of a storage service executing on real node 1. While a real node can certainly execute multiple instances of a storage service, it can be preferable, in some embodiments to distribute storage service instances, for example, to prevent bunching up of instances on just a few real nodes. However, there can be circumstances where an uneven distribution of storage services can also be preferable, for example, where computing resources are not similar across/between all real nodes, etc. As an example, where real node 1 has much greater computing resources than another real node that doesn't yet have a storage service instance, it can still be preferable to add a second storage service instance to real node 1 rather than to the other real node because of the much greater computing resources of real node 1 being determined to be able to execute multiple instances of storage services causing a real cluster to perform better than having an instance at each of real node 1 and at the other real node.

Proceeding to iteration number nine of actions table 350, it can be observed that mapped node 1 of MC 240 is already associated with an instance of a storage service, e.g., real node 1 already has an instance of a storage service for mapped node 1 of MC 240, which mapped node includes storage via real disk 6.1 and 6.4 on real node 6. As such, there can be no need to assign a second storage service instance to manage a mapped node that already being managed by a first storage service instance, and the action can be to simply move to the next iteration, e.g., at iteration number seven, a storage service instance was caused at real node 1 for mapped node 1 of MC 240, which mapped node can store data via real disks 1.2, 1.4, 6.1, and 6.4 of the real cluster, such that at iteration number nine, there is no need to cause a second storage service instance for mapped node 1 of MC 240.

At iteration numbers 11-15, similar to iteration number nine, it can be observed that the groups of real disks are already in mapped nodes that are associated with storage service instances already in execution on real nodes and, as such, there is no need to assign additional instances of storage services. Accordingly, actions table 350 can finish, as shown at iteration number 16. The actions illustrated in action table 350 can be comprised in MCSS data 314. MCSS data 314 can be employed to implement instantiation of storage services on the real nodes of the real cluster, for example, according to actions table 350, to support data interactions via a mapped cluster built on top of a real cluster in a manner that places storage service instances closer to larger counts of real disks associated with mapped nodes.

FIG. 4 is an illustration of example system 400 that can facilitate selective instantiation of a mapped node storage service at a real node based on a mapping of mapped disks to real disks, wherein a real node can support multiple instantiations of a mapped node storage service, in accordance with aspects of the subject disclosure. System 400 can comprise cluster storage construct 402 that can be similar to, or the same as, cluster storage construct 202. In an embodiment, cluster storage construct 402 can support mapped clusters, e.g., MC 440-446, etc. In an embodiment, MC 440-446 can correspond to portions 441-447 respectively.

The example allocation of real disks to enable mapped clusters 440-446, e.g., via portions 441-447 respectively, can be translated into mapped table 413. Mapping table 413 can therefore illustrate the mapping of MC 440 to 446 onto real disks of cluster storage construct 202. Mapping table 413 can, for example, indicate that real node 1 (read from the left hand column) contributes real disks 1.1 and 1.2 to mapped node 1 of MC 440 and real disk 1.6 to mapped node 1 of MC 446; . . . ; that real node 5 contributes real disk 5.1 to mapped node 1 of MC 440, real disks 5.2 and 5.3 to mapped node 1 of MC 442, and real disk 5.6 to mapped node 1 of MC 446; etc. Mapping table 413 can provide an understanding of groups of real disks of a real node contributing to the support of mapped nodes of mapped clusters. Analysis of mapping table 413 can facilitate instantiation of storage services on real nodes based on what real disks participate in mapped nodes of mapped clusters.

In an aspect, analysis of mapping table 413 can yield count table 430. Count table 430 can indicate a count of real disks associated with a mapped node for each real node. As an example, count table 430 can indicate that real node 1 (again read from the left hand column) contributes two real disks to mapped node 1 of MC 440, and one real disk to mapped node 1 of MC 446; . . . ; that real node 5 contributes one real disk to mapped node 1 of MC 440, two real disks to mapped node 1 of MC 442, and one real disk to mapped node 1 of MC 446; etc. The groups from count table 430, e.g., groups of one, two, three, four, etc., real disks, can be employed in directing where an instance of a storage service can execute. In an embodiment, storage services can be instantiated by traversing mapping table 413 or count table 430, for example from left to right then down. As an example, starting in the upper left corner of count table 430, a first storage service for mapped node 1 of MC 240 can be provisioned on real node one, then a second storage service can be provisioned on real node 2 for mapped node 2 of MC 240 by skipping mapped node 1 of MC 446 because real node 1 already has one storage service instance in execution. This embodiment, for example, can simply cause a storage service for the first mapped node being provided with real disks regardless of the count of real disks being provided. This can result in a storage service facilitating a larger group of real disks in the same mapped node but stored on another real node.

In another embodiment, larger groups can be provisioned first with an instance of a storage service, prior to provisioning smaller groups with an instance of a storage service, which can result in keeping larger groups of real disks associated with a mapped node closer to a corresponding instance of a storage service which, in turn, can reduce a burden on computing resources in comparison to having an instance of a storage service farther from a large group of real disks. As an example, an instance of a storage service enabling mapped node 1 of MC 440 can be instantiated at any real node, although generally it is preferable to have it execute on a node comprising at least one real disk correlated to the mapped node where other factors, e.g., key performance indicators (KPIs) of the computing resources of the real nodes or real cluster, don't indicate a reason to do otherwise. Continuing this example then, it would be preferable to cause the storage service at either real node 1, 3 or 5. Selection from among real nodes 1, 3, or 5, can be based on real disk counts, e.g., real node 1 contributes two real disks and each of real nodes 3 and 5 contribute one real disk. Generally, according to an example count based selection, the instance of the storage service can be instantiated on real node 1, which contributes more real disks to mapped node 1 of MC 440 than either real node 3 or real node 5. As such, data interactions with mapped node 1 of MC 440 are more likely to be performed on the two real disks of real node 1 than on the one real disk of either real nodes 3 or 5 and, accordingly, there can be, for example, less data transfer (and associated data processing) between real nodes in this scheme than can be experienced where the storage service instance is instead located at either real node 3 or 5. Count table 330 can be employed in determining instantiation of a storage service by group size, e.g., a count of real disks contributing to a mapped node to reduce computing resource burdens by trying to keep the storage service instance closer to more of the real disks contributing to the mapped node.

FIG. 5 is an illustration of example system 500 that can facilitate selective instantiation of a mapped node storage service at a real node ordered by a count of real disks supporting a mapped node, wherein a real node can support multiple instantiations of a mapped node storage service, in accordance with aspects of the subject disclosure. System 500 can comprise mapping table 513 and count table 530. In an embodiment, mapping table 513 can be the same as, or similar to, mapping table 413, and count table 530 can be determined from mapping table 530, thus count table can also be the same as, or similar to, count table 430. Count table 530 can be employed to determine actions table 550.

Actions table 550 can indicate actions related to instantiating storage services via computing resources of real nodes of a real cluster(s). Similar to actions table 350, actions table 550 can assign instances of storage services according by a count of real disks contributing to a mapped node, for example, by traversing count table from left to right then down according to largest counts first, e.g., node 2 real disks of mapped node 2 for MC 440 would be provisioned with an instance of a storage service prior to provisioning a storage service for node 1 real disk(s) for mapped node 1 of MC 446 because node 2 contributes two real disks to mapped node 2 for MC 440 while real node 1 only contributes one real disk to mapped node 1 for MC 446, etc. Further, node 1 real disks of mapped node 1 of MC 440 can be provisioned with a storage service instance before provisioning node 2 real disks of mapped node 2 of MC 440 simply because the former appears higher and to the left of the later in count table 530. Other orders of traversing groups sorted by size are readily appreciated and are within the scope of the disclosed subject matter despite not being explicitly recited for the sake of clarity and brevity.

Action table 550, at iteration number one, can indicate causing an MCSS at real node 1 supporting mapped node 1 of MC 440, which can be based on count table 530. Similarly, at iteration number two, another storage service instance can be cause at real node 2 supporting mapped node 2 of MC 440. Instantiation of storage services can continue until iteration number five, where it can be determined that an MCSS for mapped node 1 of MC 442 has already been instantiated at iteration number three, and therefore there is no need to cause a second storage service for the same mapped node, therefore actions table 550 can indicate moving to the next iteration without other action. Similarly, iteration number six can move to iteration number seven.

At iteration number 7 of actions table 550, it can be determined that real node 1 is already allocated a first storage service instance, e.g., from iteration number 1. Rather than allocating a second storage service instance on real node 1, allocation of a storage service for real disk 1.6 can be deferred, e.g., skipped, etc., until other allocations have been determined, see iteration number 19 where real disk 1.6 is again considered. Actions table 550 can indicate other 'next' and 'skip' actions through iteration number ten, which can indicate assigning an instance of a storage service to real node 3 for mapped node 2 of MC 446.

At iteration number 19, previously skipped provisioning of a storage service instance for real disk 1.6 can be revisited, e.g., the previous iterations have addressed all other real disks for assignment, next, or skip. Upon arriving at iteration number 19, it can be observed that mapped node 1 of MC 446 is not yet associated with an instance of a storage service and can also be observed that real node 1 already has one instance of a storage service already assigned from iteration number 1. As such, either a second iteration of a storage service can be caused at real node 1 or an iteration of the storage service can be caused at another real node, for example at other real nodes contributing a real disk to support mapped node 1 of MC 446, e.g., real nodes 2, 5, or 6. Whereas, assuming the computing resources of real nodes 1, 2, 5, and 6 are equivalent, the other real nodes also already have one instance of a storage service assigned, it can be determined that either the second iteration of the storage service can be caused at real node 1 or an iteration of the storage service can be caused at another real node that does not contribute a real disk to support mapped node 1 of MC 446, e.g., real nodes 3, 4, 7, 8, etc., however, real node 3 also already has one MCSS instance assigned and can therefore be less favored. Accordingly, it can be determined if a second MCSS on real node 1 or a first MCSS on real nodes 4, 7, or 8, results in a more favorable operation of the real cluster, e.g., which action burdens the computing resources of the real nodes and real cluster the least, etc. This can be determined based on, for example, modeling, a selection rule, KPIs, etc. System 500 illustrates selecting to instantiate a second MCSS on real node 1, e.g., a 'special action,' to support mapped node 1 of MC 446. Accordingly, iteration numbers 20-22 result in 'next' actions because the MCSS for mapped node 1 of MC 446 was assigned in iteration 19. Accordingly, the actions of actions table 550 can finish at iteration number 23. Actions 550 can be comprised in MCSS data, e.g. MCSS data 114, 314, etc. and can result in MCSS instantiations shown in table 552, e.g., real node 1 has two instances of MCSSs, real nodes 2, 5, and 6, each have one instance of an MCSS, and real nodes 4, 7, and 8 do not have instances of an MCSS.

Figure 6:
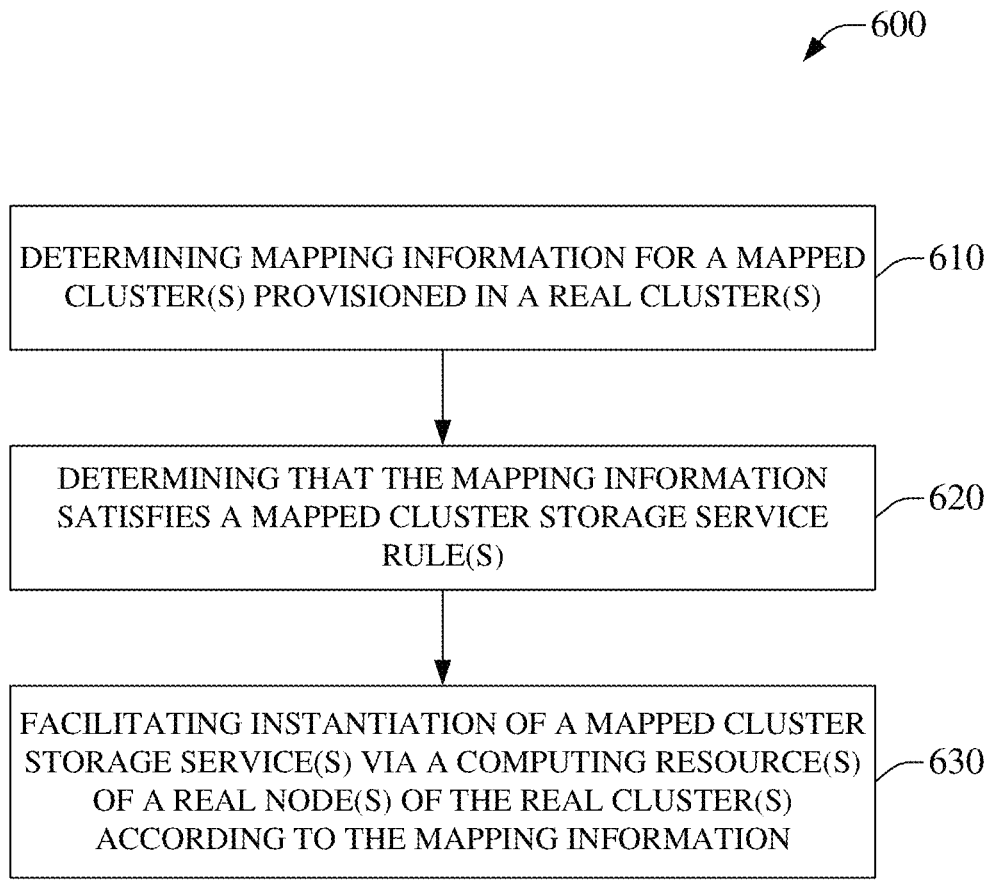
FIG. 6 is an illustration of an example method facilitating selective instantiation of a mapped node storage service at a real node based on a mapping of mapped disks to real disks, in accordance with aspects of the subject disclosure.
Figure 7:
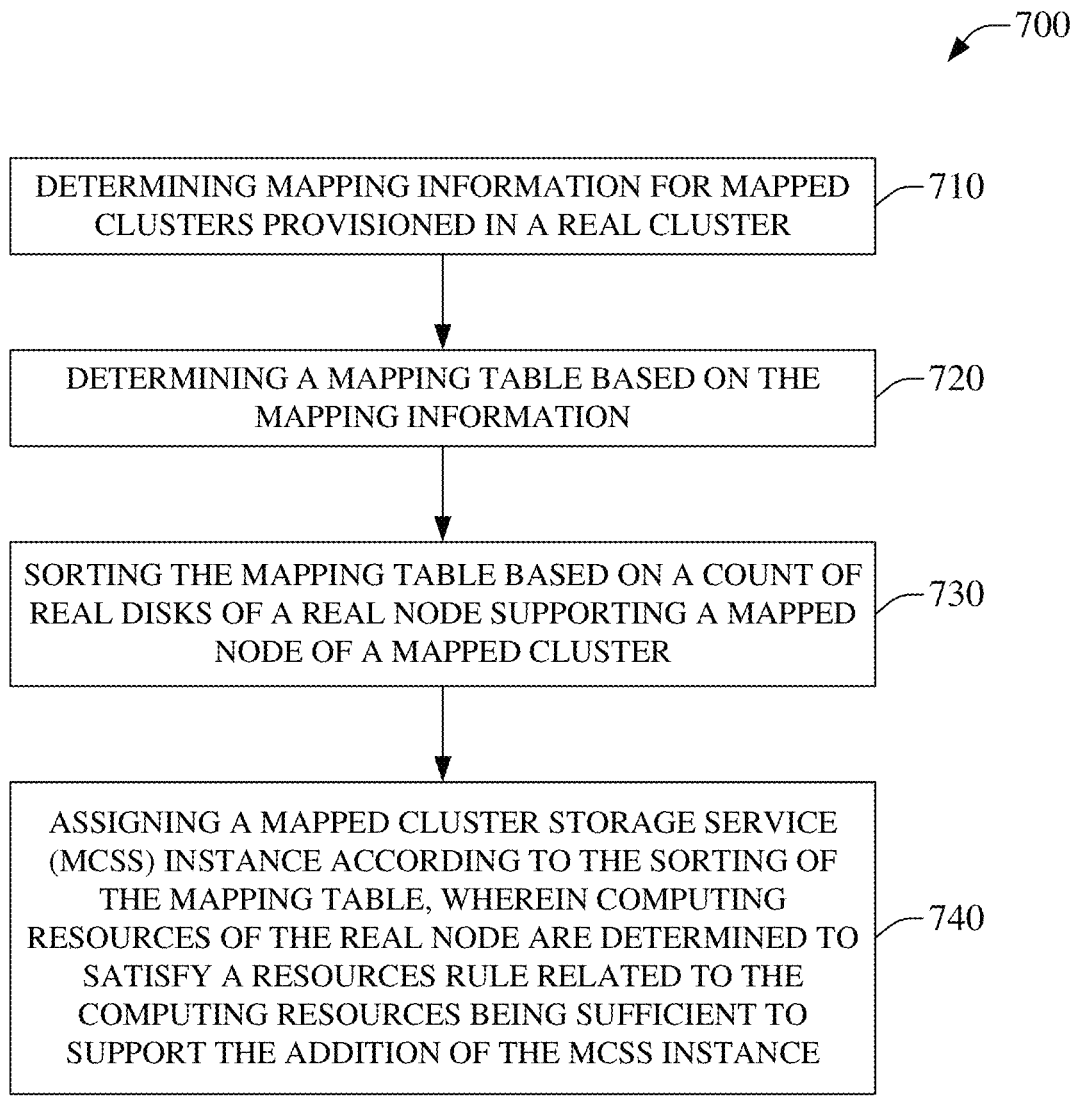
FIG. 7 is an illustration of an example method facilitating selective instantiation of a mapped node storage service at a real node ordered by a count of real disks supporting a mapped node, in accordance with aspects of the subject disclosure.
Figure 8:
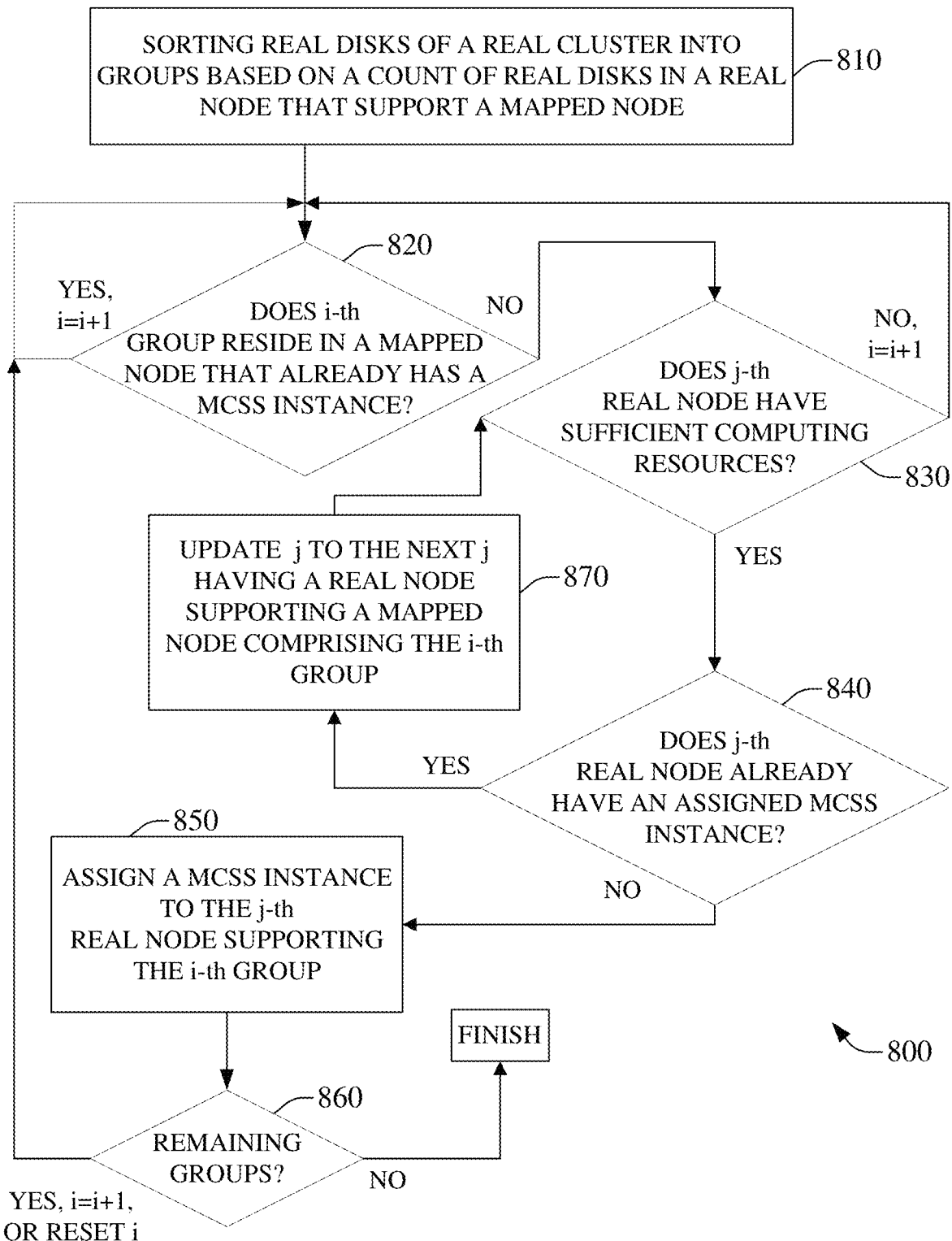
FIG. 8 illustrates an example method enabling selective instantiation of a mapped node storage service at a real node, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate selective instantiation of a mapped node storage service at a real node based on a mapping of mapped disks to real disks affinity sensitive data storage distribution of logical data across real storage devices, in accordance with aspects of the subject disclosure. Method 600, at 610, can comprise determining mapping information for a mapped cluster provisioned in a real cluster. A group of mapped nodes can appear to be a contiguous block of data storage even where, for example, it can be spread across multiple portions of one or more real disks, multiple real groups of hardware nodes, multiple real clusters of hardware nodes, multiple geographic locations, etc. Mapping information can reflect which real disks support mapped nodes of a mapped cluster.

Method 600, at 620, can comprise determining that the mapping information satisfies a mapped cluster storage rule. An example of a first mapped cluster storage rule can be that a first threshold level of real disks supporting a mapped node of a mapped cluster exist on a real node. Accordingly, a second mapped cluster storage rule can be that a second threshold level of real disks supporting a mapped node of a mapped cluster exist on a real node. Thus, at 630, method 600 can comprise facilitating instantiation of a MCSS via a computing resource of a real node of the real cluster according to the mapping information. As such, by layering the example mapped cluster storage rules, real nodes having the first, second, etc., threshold number of real disks contributing to a mapped node can be allocated MCSS instances in a manner that results in a MCSS instance being closer to larger groups of real disks of a real node for a given mapped node than to smaller groups of real disks of other real nodes for the given mapped node. At this point method 600 can end.

FIG. 7 is an illustration of an example method 700, facilitating selective instantiation of a mapped node storage service at a real node ordered by a count of real disks supporting a mapped node, in accordance with aspects of the subject disclosure. At 710, method 700 can comprise determining mapping information for mapped clusters provisioned in a real cluster. As previously discussed, a group of mapped nodes can appear to be a contiguous block of data storage even where, for example, it can be spread across multiple portions of one or more real disks, multiple real groups of hardware nodes, multiple real clusters of hardware nodes, multiple geographic locations, etc. Mapping information can reflect which real disks support mapped nodes of a mapped cluster.

At 720, method 700 can comprise determining a mapping table based on the mapping information. A mapping table can be, for example, depicted as shown in FIGS. 2-5, etc., e.g., mapping table 213, 413, 513, etc. A mapping table can indicate real disks of a real node of a real cluster supporting a mapped node of a mapped cluster. At 730, the mapping table can be sorted based on a count of the real disks of a real node supporting a mapped node of a mapped cluster. In an embodiment, the sorting, can indicate real nodes contributing more real disks for a mapped node before real nods contributing fewer real disks for a mapped node. As an example, real node 1 can be indicated before real node 3 from mapping table 513 because real node 1 comprises a group having two real disks supporting one mapped node while real node 3 does not comprise a group having two real disks supporting any one mapped node. In an embodiment, real node 1 can be indicated before real node 2 from mapping table 513 because while both real node 1 and real node 2 comprise a group having two real disks supporting one mapped node, real node 1 appears in mapping table 513 earlier than real node 2 when following, for example, a left to right then down traversal of mapping table 513.

At 740, method 700 can comprise assigning a MCSS instance according to the sorting of the mapping table. At this point method 700 can end. In an aspect, this can result in first assigning MCSS instances to larger groups of real disks supporting a mapped node, before assigning MCSS instances to smaller groups. Accordingly, MCSS instances can be assigned in manner that results in an MCSS instance being assigned to a real node that is closer to the larger groups which can reduce a burden on computing resources of the real nodes of the real cluster in comparison to another assignment scheme that can result in some large groups being located further from an associated MCSS instance, e.g., it can be favorable to control, via an MCSS instance, more real disks supporting a mapped cluster by running the MCSS instance on the node contributing the real disks than to run the MCSS instance on a real node having fewer real disks supporting the mapped node.

In an aspect, at 740, the assignment can be constrained by also determining that the computing resource(s) of the proposed real node satisfy a resources rule. The resources rule can be related to determining that the available computing resources of a real node proposed for instantiation of an MCSS instance are sufficient to support the addition of the MCSS instance. As an example, if a real node is already heavily burdened, it can be undesirable to add further burden by assigning an MCSS instance to that real node, in which case, other real nodes can be moved higher in a ranking, ordering, sorting, etc., of possible real nodes on which to instantiate the MCSS instance. Of note, the resources rule can evaluate individual real nodes as well as the operation of the real cluster itself, e.g., the resources rule can be satisfied when despite further burdening a first real node, the whole real cluster performs better than other assignment options. As an example, where adding a new instance of an MCSS as second instance of an MCSS to a first real node already assigned a first instance of an MCSS is determined to result in a first expected real cluster performance and where adding the new instance of the MCSS as a first instance to a second real node is determined to result in a second expected real cluster performance, where the first expected performance is favorable to the second expected performance, the new instance can be assigned as a second instance at the first node despite it further burdening the first node computing resources more heavily than it would have if assigned to the second real node. However, in this example, where the first real node would be unable to concurrently run the first and second instance, for example due to a lack of computing resources, etc., then the new instance can be assigned as a first instance to the second real node despite the overall performance of the real cluster being expected to be less favorable.

FIG. 8 is an illustration of an example method 800, which can enable selective instantiation of a mapped node storage service at a real node, in accordance with aspects of the subject disclosure. At 810, method 800 can comprise sorting real disks of a real cluster into groups based on an account of real disks in a real node that support a mapped node. Generally the groups can be ordered from largest to smallest group, e.g., a group of four real disks of a real node that support one mapped node can be ranked higher than a group of three real disks, etc.

At 820, method 800 can comprise determining if an i-th group of the groups of real nodes reside in a mapped node that already has a MCSS instance associated with it. A mapped node can map to real disks from more than one real node, as such, an i-th group of real nodes can be said to reside in a mapped node where the group of real disks are real disks that correspond to the mapped node. As an example, mapped node 1 of MC 240 in FIG. 2 comprises mapped disks 1.2*m*, 6.1*m*, 1.4*m*, and 6.4*m* that correspond respectively to real disks 1.2, 6.1, 1.4, and 6.4. Accordingly, real node 1 can have a two disk group and real node 6 can have a two disk group that can each be said to reside in the mapped cluster, e.g., both groups of real disks contribute to enabling mapped node 1 of MC 240. If the i-th group does reside in a mapped node that already has a MCSS instance associated with it, then the next group can be analyzed because the mapped node can already be subject to control via an existing storage service instance. Where the i-th group does not reside in a mapped node that already has a MCSS instance associated with it, then method 800 can proceed to 830.

At 830, method 800 can comprise determining if a j-th real node has sufficient computing resources to facilitate running an instance of a MCSS. The j-th real node can be a real node comprising the group of real disks. The sufficiency of the computing resources for the real node can be analyzed to determine if executing an instance of a MCSS will have negative effects on the real node itself or on the real cluster comprising the real node. If the real node is determined to be insufficient to perform the instance of the MCSS, then assigning the group can be skipped and a next group can be analyzed, e.g., the group can be moved to a later point in the queue of groups. Where the real node/cluster are not sufficiently burdened, the real node can be a candidate for instantiation of the MCSS instance and method 800 can move to 840. It can be determined, at 840, if the j-th real node already has an assigned MCSS instance, e.g., if the real node comprising the real disks of the group is already running a MCSS instance for another mapped node. If the j-th real node is already running assigned a MCSS instance, then at 870, method 800 can comprise updating the j-th real node to a next real node having a real disk contributing to the support of a mapped node comprising the i-th group. As an example, from FIG. 2, if the i-th group is real disk 1.2 and 1.4 of real node 1, e.g., real node 1 is the j-th real node, and the i-th group supports mapped node 1 of MC 240, then the next j-th real node can be real node 6 because the group of real disks 6.1 and 6.4 also contribute to the support of mapped node 1 of MC 240.

Method 800 moves to 850 where the j-th real node does not already have an assigned MCSS instance and, as such, the i-th group and j-th real node both do not correspond to an existing MCSS instance and the j-th real node has sufficient computing resources to perform the instance of the MCSS. As such, at 850, method 800 can assign a MCSS instance to the j-th real node comprising the i-th group of real disks supporting the mapped node. At this point, method 800, at 860, can determine if there are remaining groups. Where there are no remaining groups, e.g., all groups of real disks have been are controlled by an instance of a MCSS, then method 800 can end.

Where there are remaining groups, then the i-th group can be incremented to the next group. Where the last i-th group has been reach, but some groups have been skipped at 820 or 830, then the i-th group can be reset to the first group so that method 800 can continue and process the skipped groups. It will be noted that method 800 can fail if, after iterating, a group cannot eventually be assigned to an instance of a MCSS.

Method 800, for example, can be set in the context of FIG. 3, wherein at 810 groups of four, three, two, and one real disk corresponding to count table 330 can be determined. At 820, group of four real disks, e.g., 3.1 to 3.4 can be determined not to reside in a mapped node, e.g., mapped node 1 of MC 242 from mapping table 213, which already has an MCSS instance. Then at 830, the j-th real node, e.g., real node 3, can be determined to have sufficient computing resources and, at 840, can be determined to not already have an assigned MCSS instance, such that, at 850, an MCSS instance can be assigned to real node 3 to support mapped node 1 of MC 242, which is in agreement with iteration number one of actions table 350. At this point, many other groups remain and, at 860, the next group can be analyzed during a next iteration entering at 820 of method 800. The next iteration proceeds similarly and results in assigning an MCSS instance to real node 7, in accord with iteration number 2 of actions table 350. Similarly, iterations 3-7 proceed as disclosed.

At the next iteration, the group of real disks 1.1 and 1.3 can be determined, at 840, to be in a real node that already has an assigned MCSS instance, e.g., j=real node 1 that already has at least one instance of a MCSS assigned to it. Here method 800 can diverge from system 300 of FIG. 3. At 870, method 800 can update j to j=real node 6, because mapped node 3 of MC 242 is supported by two real disks for real node 1 and two real disks from real node 6, therefore real node 6 is the next j-th real node. Returning to 840 via 830, real node 6 can be determined to not yet be assigned a MCSS instance, which can be performed at 850. In the next iteration of method 800 the group of disks is 6.1 and 6.4, which, at 820, can be determined to already reside in a mapped node having a MCSS instance, and method 800 can proceed to the following i-th group, real disks 6.2 and 6.3 with similar results. Method 800 can continue to iterate until all groups are associated with an MCSS instance.

Figure 9:
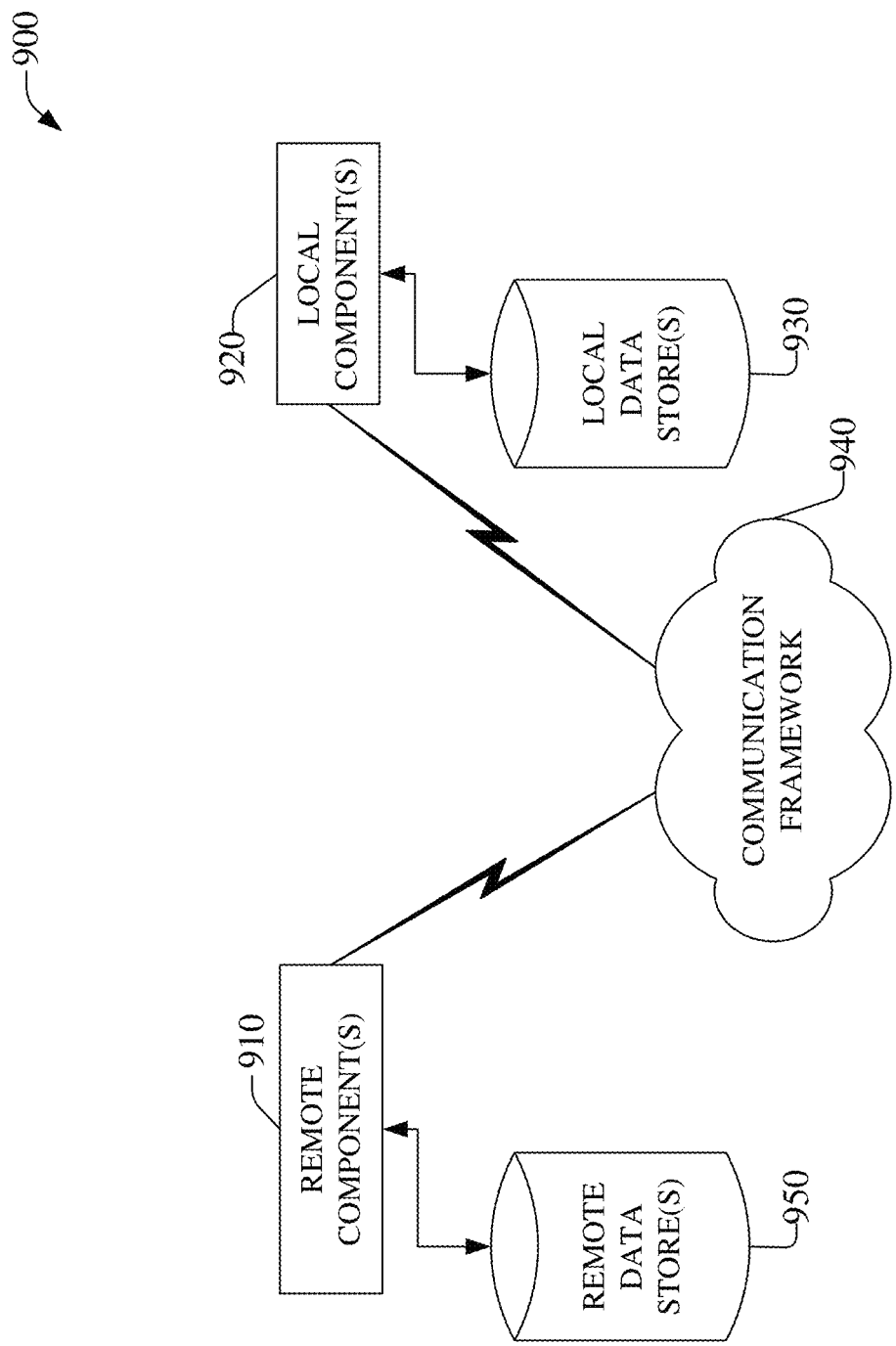
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real nodes of a real cluster in communication with other real nodes of the real cluster that can be located in a different physical location. Communication framework 940 can comprise wired network devices, wireless network devices, mobile devices, wearable devices, radio access network devices, gateway devices, femtocell devices, servers, etc. In an aspect, a real cluster can be comprised of physically disparate devices, e.g., a real cluster can comprise devices in entirely different data centers, different cities, different states, different countries, etc. As an example, nodes 1-4 of cluster storage construct 102 can be located in Seattle Wash., while nodes 5-6 can be located in Boston Mass., and nodes 7-N can be located in Moscow Russia.

The system 900 also comprises one or more local component(s) 920. The local component(s) 920 can be hardware and/or software (e.g., threads, processes, computing devices). In some embodiments, local component(s) 920 can be real nodes of a real cluster in communication with other real nodes of the real cluster that can be located in a different physical location.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate KPIs, move stored data between local and remote real nodes, such as when a selectively instantiating a mapped cluster storage service instance, etc.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct 102, 202, 402, etc., e.g., in the nodes thereof, comprise in mapped cluster control component 110, etc., MC storage service component 112, 312, etc., or comprised in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising selecting first real disks of a real node of a real cluster based on how many real disks comprise the first real disks, wherein the first real disks map to at least a portion of a first mapped node of a first mapped cluster, and further comprising, causing a first instance of a mapped cluster storage service to run on computing resources of the first real node based on the first real disks, as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving mapping data indicating an allocation of real storage devices comprised in real nodes comprised in a real storage cluster, wherein the allocation of the real storage devices supports a logical representations of mapped storage devices comprised in mapped nodes of mapped storage clusters; and
executing a first instance of a mapped cluster storage service at a first real node of the real nodes based on a first count of a first portion of the real storage devices, wherein the first portion of the real storage devices demonstrate a selected first level of proximity among first devices of the first portion of the real storage devices, and wherein the first portion of the real storage devices facilitates data interactions via a first mapped node of the mapped nodes.

2. The system of claim 1, wherein the executing the first instance of the mapped cluster storage service is further based on determining that a sufficiency rule is satisfied by first computing resources of the first real node, wherein the sufficiency rule relates to computing resources being sufficient to execute the first instance of the mapped cluster storage service above a threshold performance level.

3. The system of claim 2, wherein the operations further comprise, in response to determining that the sufficiency rule is not satisfied by the first computing resources of the first real node, substituting a second portion of the real storage devices for the first portion, and wherein the second portion of the real storage devices facilitates data interaction via a second mapped node of the mapped nodes.

4. The system of claim 3, wherein the second portion of the real storage devices is selected based on a second count of the portion of the real storage devices, and wherein the second portion of the real storage devices demonstrate a selected second level of proximity among second devices of the second portion of the real storage devices.

5. The system of claim 3, wherein the second mapped node is a same mapped node as the first mapped node.

6. The system of claim 1, wherein the executing the first instance of the mapped cluster storage service is further based on determining that execution of a second instance of the mapped cluster storage service is not assigned to a second real node of the real nodes to facilitate data interactions via the first mapped node.

7. The system of claim 6, wherein the operations further comprise, in response to determining that the second instance of the mapped cluster storage service is assigned to execute via the second real node, substituting a second portion of the real storage devices for the first portion of the real storage devices.

8. The system of claim 1, wherein the executing the first instance of the mapped cluster storage service is further based on determining that the first real node has not been assigned execution of a second mapped cluster storage service to facilitate data interactions via a second mapped node of the mapped nodes.

9. The system of claim 8, wherein the operations further comprise, in response to determining that the first real node has been assigned execution of a second mapped cluster storage service, substituting a third real node of the real nodes for the first real node.

10. The system of claim 9, wherein the third real node comprises a second portion of the real storage devices that facilitate data interactions via the first mapped node of the mapped nodes.

11. The system of claim 1, wherein the executing the first instance of the mapped cluster storage service based on the first count of the first portion of the real storage devices is further based on the first count being a higher count than a second count of a second portion of the real storage devices, and wherein the second portion of the real storage devices facilitates data interactions via a second mapped node of the mapped nodes.

12. The system of claim 1, wherein each real node of the real storage cluster is assigned execution of one instance of the mapped cluster storage service.

13. The system of claim 1, wherein at least one real node of the real storage cluster is assigned execution of at least two instances of the mapped cluster storage service.

14. The system of claim 1, wherein the first count of the first portion of the real storage devices is determined from the mapping data, wherein the first count indicates a number of real storage devices in the first portion of the real storage devices, wherein the first portion of the real storage devices is comprised in one real node of the real nodes, and wherein the first portion of real storage devices correlate to at least a second portion of the first mapped node.

15. A method, comprising:
determining, by a system comprising a processor and a memory, a first number of first real disks of a real cluster, wherein the first real disks map to at least a portion of a first mapped node of a first mapped cluster;
ranking, by the system, the first real disks among other real disks of the real cluster, wherein the ranking is based on a proximity between real disks comprising the first number of the first real disks; and
instantiating, by the system, a first instance of a mapped cluster storage service at a first real node of the real cluster based on the first instance of the mapped cluster storage service being determined to satisfy an instantiation rule, wherein the instantiation rule is related to the ranking of the first real disks.

16. The method of claim 15, wherein the instantiating the first instance of the mapped cluster storage service is based on the instantiation rule further being related to the first real node being determined to comprise at least a threshold amount of computer resources to execute the first instance of a mapped cluster storage service.

17. The method of claim 15, wherein the instantiating the first instance of the mapped cluster storage service is based on the instantiation rule further being related to determining that the first mapped cluster is not already associated with a second instance of the mapped cluster storage service.

18. The method of claim 15, wherein the instantiating the first instance of the mapped cluster storage service is based on the instantiation rule further being related to determining that the first real node is not already instantiating a second instance of the mapped cluster storage service in support of a second mapped node of a second mapped cluster.

19. A non-transitory machine-readable storage medium, comprising executable instructions that, when executed by a processor, facilitate performance of operations, comprising:
selecting first real disks of a real node of a real cluster based on how many real disks comprise the first real disks, wherein the first real disks are within a designatable distance of each other, and wherein the first real disks map to at least a portion of a first mapped node of a first mapped cluster; and
causing a first instance of a mapped cluster storage service to execute using computing resources of the first real node based on the first real disks.

20. The non-transitory machine-readable storage medium of claim 19, wherein the causing the first instance of the mapped cluster storage service to execute using the computing resources of the first real node is further based on determining that the computing resources of the first real node are not executing a second instance of the mapped cluster storage service, that the first real node is not associated with a third instance of the mapped cluster storage service, and that the computing resources of the first real node are at least at a threshold level of performance.

* * * * *